Oct. 25, 1966  F. F. CILYO  3,281,678
MAGNETIC CORE-LOSS TESTER FOR CONTINUOUS STRIP
Filed April 26, 1962  4 Sheets-Sheet 3

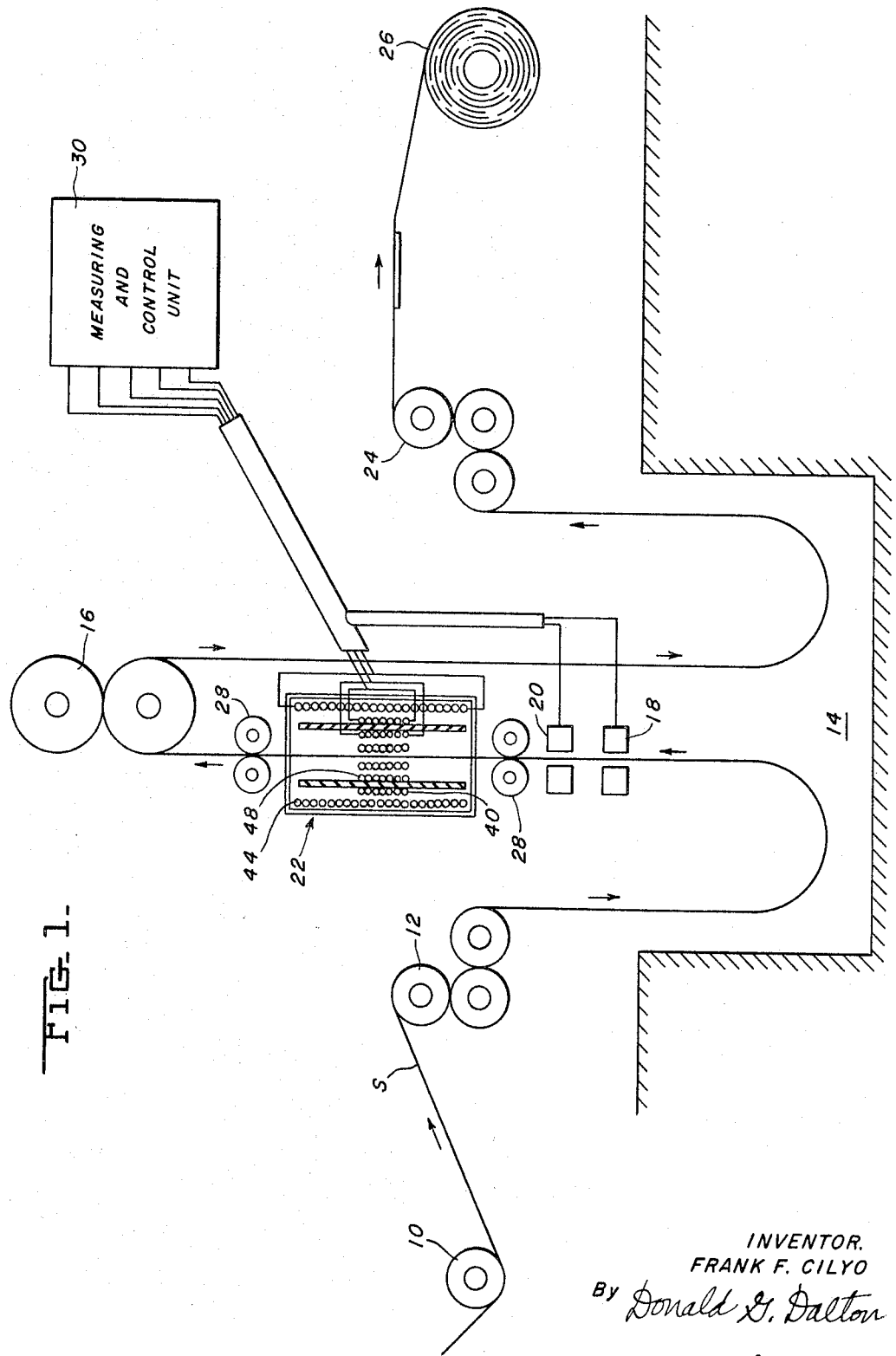

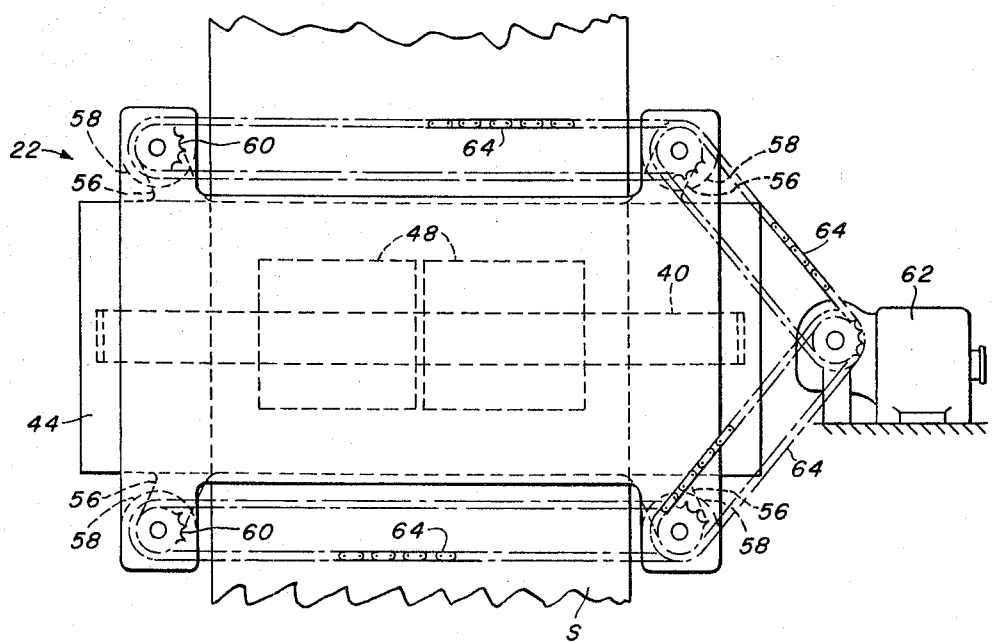
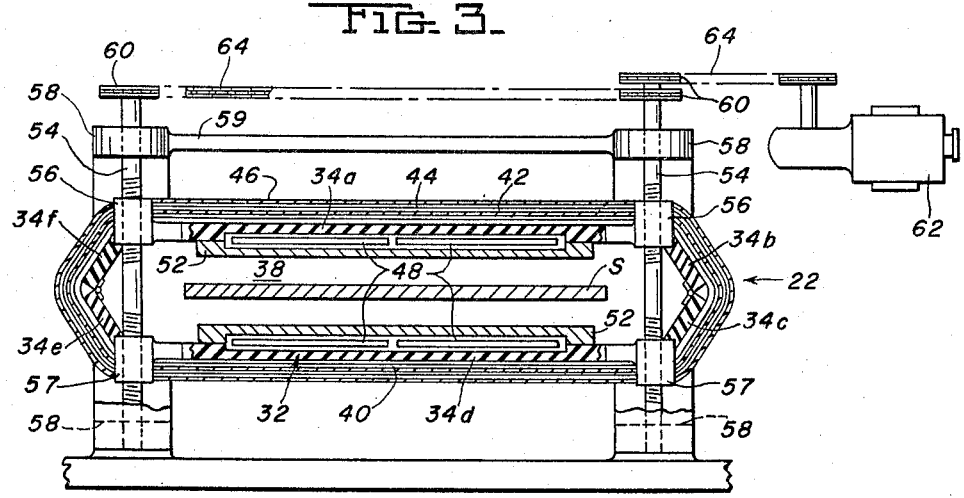

INVENTOR.
FRANK F. CILYO
By Donald G. Dalton
Attorney

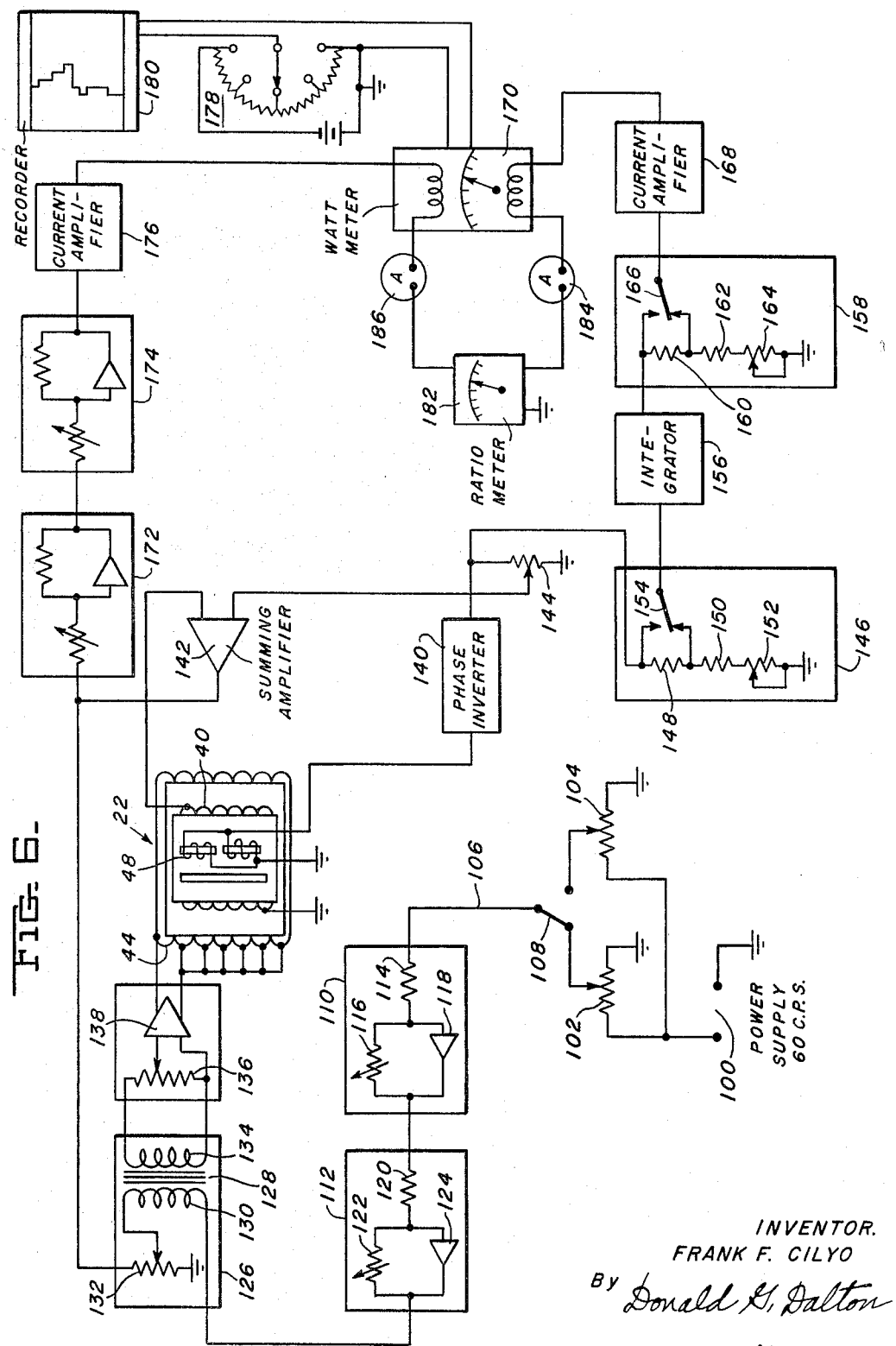

3,281,678
MAGNETIC CORE-LOSS TESTER FOR CONTINUOUS STRIP
Frank F. Cilyo, Export, Pa., assignor to United States Steel Corporation, a corporation of Delaware
Filed Apr. 26, 1962, Ser. No. 190,344
6 Claims. (Cl. 324—34)

This invention relates to determining the magnetic properties of strip material and, more particularly, to testing steel strip for magnetic properties.

The quality of electrical steel sheets is to a large extent dependent upon their magnetic properties. Steel strip or sheets failing to meet specified magnetic requirements must either be sold as a cheaper grade of material or reprocessed. It is therefore desirable to measure certain electrical properties of the steel strip as it is being processed, and the process variables controlled in response to the measured properties.

It has heretofore been necessary to obtain special samples from the material and test these samples to determine the magnetic properties of the strip. By the time the test is completed the strip has been processed. Therefore, it has not been possible heretofore to control the process variables in response to measured magnetic properties.

It is therefore a principal object of this invention to provide a testing device which will measure the magnetic condition of strip material continuously.

A related principal object of this invention is the provision of an apparatus which will measure the magnetic condition of strip rapidly and efficiently as the strip is being processed.

A further object of this invention is the provision of a magnetic testing device which will accommodate strip having normal imperfections.

A more particular object of this invention is the provision of a magnetic testing device which has an expansible transducer head adapted to accept various sizes of strip material having normal imperfections.

Yet another more general object of this invention is the provision of a magnetic property testing device which inherently produces a distortion free signal.

Still a further object of this invention is the provision of a magnetic testing device which inherently maintains a selected constant flux-density.

Still another more general object of this invention is the provision of a magnetic testing device incorporating simplified circuitry to produce an accurate rapid measurement.

Other objects and advantages of the invention will become apparent from the following description and accompanying drawings, in which:

FIG. 1 is an elevational view somewhat schematic of the device of this invention showing strip passing therethrough;

FIGURE 2 is a plan view of the transducer head of this invention;

FIGURE 3 is a longitudinal sectional view of the device of FIGURE 2;

FIGURE 6 is a schematic wiring diagram of the device of this invention.

Figure 4:
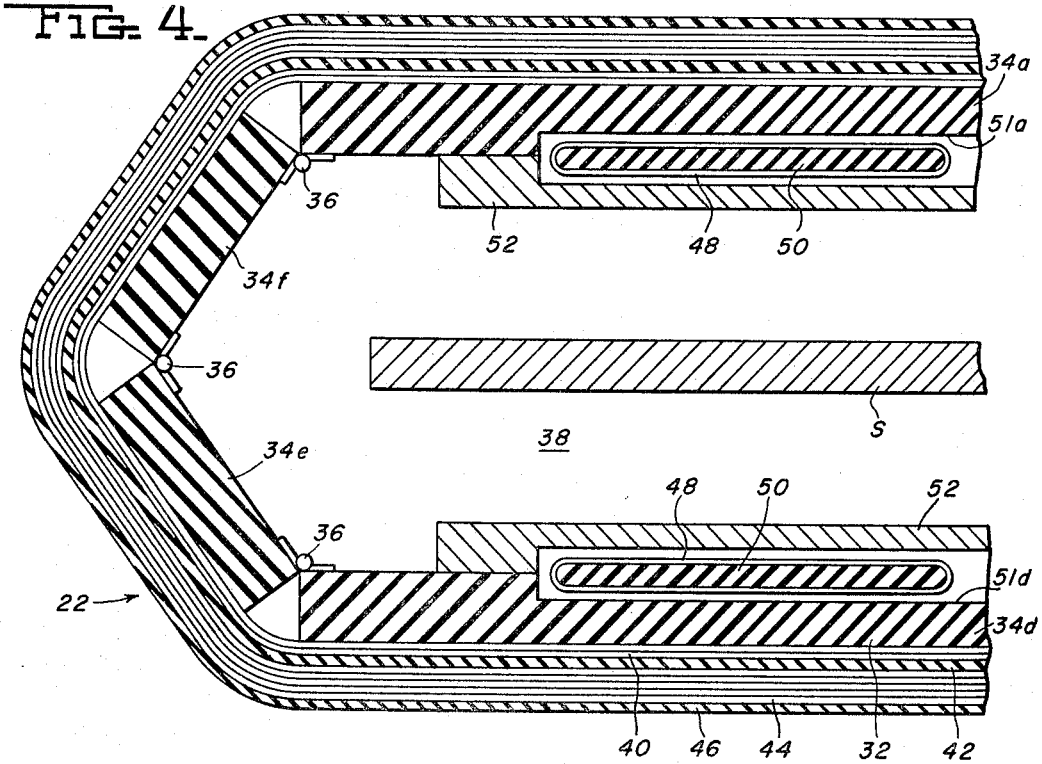
FIGURE 4 is a detailed sectional view of a portion of the device of FIGURE 3 shown on an enlarged scale.
Figure 5:
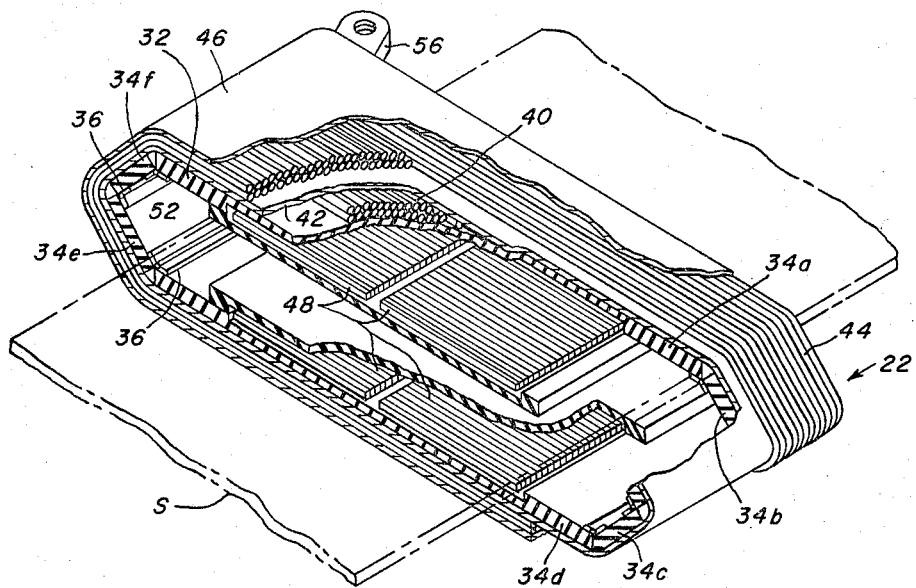
FIGURE 5 is a perspective view of the transducer head partially in section with parts broken away for clarity.

Referring now to the drawings and more particularly to FIGURE 1 the device of this invention is shown in use with a moving strip of material designated by the reference character S. The material S is emerging from a previous process (not shown) and travelling in the direction designated by the arrows. As strip S emerges from the process it passes under roll 10 and thence through a set of bridle rolls 12 and into a looping pit 14. The strip S is drawn from the looping pit by a set of pinch rolls 16 and it passes a width gauge 18 and thickness gauge 20 and then through a transducer head 22. The pinch rolls 16 deliver the strip back into the looping pit 14 and it is drawn therefrom by a second tension bridle arrangement 24 and coiled by a recoiler 26. Sets of guide rolls 28 are provided on opposite sides of the transducer head 22 to guide the strip in its travel. The transducer head 22, the thickness gauge 20 and the width gauge 18 are connected to a measuring and control unit 30 which will be described presently.

Referring now to FIGURES 2, 3 and 4, the transducer head 22 includes an expansible form 32 which is made up of a plurality of hard rubber sections 34a, 34b, 34c, 34d, 34e and 34f interconnected by hinges 36 to form an annular ring. This ring defines a through central passage 38 through which the moving strip passes. A flux-density measuring coil 40, commonly known as a B coil, is formed from wire and wrapped around the form 32. Insulating tape 42 is wrapped around the B coil 40 and around the tape 42 a magnetizing or M coil 44 is wound. Insulating tape 46 is wound around the M coil 44. As can be seen in the figures, both the B coil 40 and the M coil 44 are wrapped around the passage 38 and hence, surround the strip as it passes through this passage.

A series of magnetizing force sensing coils 48 commonly known as H coils are wound on separate hard rubber forms 50. Two of the coils 48 are placed in grooves 51a on section 34a on one side of the passage 38 and two of the coils 48 are placed in grooves 51d on section 34d on the other side of the passage 38. Copper plates 52 are provided to protect the H coils 48 from damage. The form 32 is secured to a plurality of threaded rods 54 by collars 56 and 57. Four threaded collars 56 are attached to section 34a and four threaded collars 57 are attached to section 34d. The rods have one hand threads engaging collars 56 and opposite hand threads engaging collars 57. When the rods 54 are rotated in one direction collars 56 and 57 will move apart thus moving apart sections 34a and 34d thereby increasing the thickness of the opening 38. When the rods are rotated in the other direction the opening 38 will be decreased as opposed collars 56 and 57 are drawn toward each other. The rods 54 are journalled in bearings 58 which are mounted on frame member 59. The rods 54 are provided with sprockets 60 connected to a reversible motor 62 through chains 64. When the motor 62 is actuated in one direction the rods 54 will be rotated to move sections 34a and 34d apart which will increase the thickness of the opening 38, and when the motor 62 is actuated in the other direction the rods 54 will be rotated in the opposite direction to move sections 34a and 34d toward each other which will decrease the thickness of the opening 38. In operation, the desired opening is preselected and the strip passed therethrough. However, as strip having wavy edges or blisters or similar defects approaches the transducer head 22 the motor 62 can be actuated to increase the opening until these defects have passed and then the motor actuated to return the head to its normal selected distance. Because the circuit, to be described later, is adjusted for a selected opening thickness, when this thickness is changed to allow defective strip to pass, measurements are not taken.

Referring now to FIGURE 6, the transducer head 22 and associated measuring and control unit 30 are shown schematically. The circuit shown is adapted to measure the core loss of strip material as it passes through the transducer head 22. This core loss is determined by inducing a magnetic flux-density (B) of a selected value in the strip material. The amount of magnetizing force (H) required to induce the selected amount of flux-density is measured. The B and H values, when plotted, form what is known as the B-H loop and the area enclosed by this loop represents the core loss of the material. To obtain this area the integral $\oint HdB$ is evaluated. The measuring and control unit 30 is adapted to provide values for and evaluate the above equation continuously as a strip of material passes through the transducer head 22.

A central voltage reference source 100 is provided which preferably is at a frequency of 60 cycles per second. The voltage reference 100 is connected to a pair of parallel connected variable resistors 102 and 104. The resistors 102 and 104 are connected to conductor 106 by a switch 108. The conductor 106 is coupled to first and second series connected operational amplifiers 110 and 112. The operational amplifier 110 includes a fixed resistor 114, a variable resistor 116, and an A.C. amplifier 118. The operational amplifier 112 is identical in construction with the operational amplifier 110 and includes a fixed resistor 120, a variable resistor 122, and an A.C. amplifier 124. The operational amplifier 112 is connected to a mixing circuit 126. The mixing circuit 126 includes a transformer 128 having a primary coil 130, one end of which is coupled to the operational amplifier 112. The other end of the primary coil 130 is connected to ground through a variable resistor 132. The transformer 128 has a secondary coil 134 connected through a variable resistor 136 to an amplifier 138. The output terminals of the amplifier 138 are connected to the magnetizing coil 44. In the preferred embodiment the magnetizing coil is segmented and the segments connected to the amplifier 138 in parallel in a well known manner as shown diagrammatically in FIGURE 6.

The H coils 48 each have one end grounded and the other end connected to the input terminal of a phase inverter 140. A suitable phase inverter is Model K2-W manufactured by Philbrick Researchers, Inc., Boston, Massachusetts. The output terminal of the phase inverter 140 is connected to one intput terminal of a summing amplifier 142 through variable resistor 144. The other input terminal of the summing amplifier 142 is connected to one end of the B coil 40 and the other end of the B coil is grounded. The above noted Model K2-W of Philbrick Researchers, Inc. is also suitable as a summing amplifier. The output terminal of the summing amplifier 142 is connected through resistor 132 to the primary coil 130 of transformer 128. This will provide a negative feed-back signal as will be described presently.

The output terminal of the phase inverter 140 is also connected to a voltage divider circuit 146. The voltage divider circuit 146 includes three series connected resistors 148, 150 and 152. The resistors 148 and 150 are fixed resistors and resistor 152 is a variable resistor. A switch 154 is provided to selectively connect the phase inverter either directly or through resistance to an integrator 156. Model K2-W of Philbrick Researchers, Inc. is also suitable as an integrator. The output terminal of the integrator 156 is connected to a density compensating circuit 158. The density compensating circuit includes three series connected resistors 160, 162 and 164 of which resistors 160 and 162 are fixed resistors and resistor 164 is a variable resistor. A switch 166 is adapted to selectively connect the integrator 156 either directly or through resistance to the input terminal of current amplifier 168. The output terminal of the current amplifier is connected to one input terminal of a watt-meter 170.

The output terminal of the summing amplifier 142 in addition to being connected to transformer 128 is connected to a pair of series connected operational amplifiers 172 and 174. The amplifiers 172 and 174 are similar in construction to operational amplifiers 110 and 112. However, in amplifiers 172 and 174 the variable resistors are arranged to perform a dividing function, whereas in the amplifiers 110 and 112 the variable resistors are arranged to perform a multiplication function. Amplifier 174 is connected to the input terminal of a current amplifier 176 and the output of the current amplifier 176 is connected to a second input terminal of watt-meter 170. One of the output terminals of the watt-meter 170 is connected to a potentiometer 178 which in turn is connected to a chart recorder 180 to record the readings of the watt-meter in a well known manner.

In the preferred embodiment the current amplifier 168 is connected to one terminal of a ratio meter 182 through watt-meter 170 and ammeter 184. A suitable ratio meter is manufactured by Sensitive Research Instrument Company, New Rochelle, New York. The other terminal of the ratio meter 182 is connected to the current amplifier 176 through watt-meter 170 and second ammeter 186.

*Operation*

As the strip is passing through the transducer head 22 the voltage reference source 100 is actuated to provide the necessary energizing current to the M coil. It is standard practice to energize the magnetizing coil to provide a flux-density in the test strip of either 10 or 15 kilogauss. The selection between these values depends upon the properties of the strip and is well known in the art. The voltage reference source 100 is connected to the amplifier 110 through either resistor 102 or 104 to provide the voltage which will produce the desired flux-density in the strip. The selected resistor 102 or 104 is varied to provide the exact value of the flux-density. The voltage is delivered through amplifiers 110 and 112 to the primary coil 130 of transformer 128. The amplifier 110 is adjusted to modify the voltage according to the width of the strip being tested and the amplifier 112 is adjusted to modify the voltage according to the thickness of the strip being tested. The amplifiers 110 and 112 can be suitably connected to width gauge 18 and thickness gauge 20 respectively to automatically respond to variations in strip width and thickness or may be manually adjusted as shown in FIGURE 6. Thus, by modifying the voltage delivered to correspond to the thickness and width of the strip being tested the voltage being delivered to the transformer 128 exactly corresponds to the cross-sectional area of the strip being tested and determines the desired flux-density in the strip. The voltage from the secondary coil 134 of the transformer 128 is delivered through amplifier 138 to the magnetizing coil 44. The current in the magnetizing coil will produce a flux-density in the strip and this flux-density is initially regulated to exactly 10 kilogauss or 15 kilogauss by variable resistor 102 or 104 after the width and thickness have been compensated for. When this adjustment has been made the flux-density in the strip has been established and it will be maintained at this established level irrespective of width variation and thickness variation of the strip being tested by amplifiers 110 and 112. Irrespective of any change in the magnetic characteristics of the material the negative feed-back, which was described above, will maintain this selected flux-density in the following way: the signal from the B coil 40 is proportional to the sum of the flux-density in the strip S and the magnetizing force in the air around the strip enclosed by the B coil. The signal induced in the H coils 48 correspond to the magnetizing force needed to induce the flux in the strip. The variable resistor 144 is provided to manually adjust the signal from the H coils to correspond to the area enclosed by the B coil less that portion of that area occupied by the strip. This modification is necessary since the desired value to be measured is the magnetizing force in the air surrounding the strip but the actual measured value corresponds to the area of the H coils. Then the signal through the resistor 144 will be proportional to the magnetizing force in the air surrounding the strip. When the signal from the B coil is fed into the summing amplifier 142 and the signal from the H coil is fed through the phase inverter 140 modified by the resistor 144 and then fed into the summing amplifier 142, the resulting output signal from the summing amplifier will be a signal corresponding to the signal in the B coil minus a signal in the H coil which output signal corresponds to the flux-density in the strip S. This output signal from the summing amplifier 142 is fed back through resistor 132 to one end of the primary coil 130 of the transformer 128. Thus, if the induced flux increases, the signal from the summing amplifier 142 will increase. As this signal increases the voltage drop across the primary coil 130 will decrease, thus decreasing the current supplied to the magnetizing coil 44. This will reduce the induced flux-density thereby reducing the signal in the B coil which will in turn reduce the value of the signal fed back to the primary coil 130 to the selected level. Conversely, when the flux-density decreases, the current supplied to the magnetizing coil 44 will increase which will increase the flux-density to the selected value. Thus, it can be seen that when the value of the flux-density has been selected the negative feed-back signal will maintain this value irrespective of changed properties of the strip. Expressed another way, a constant flux-density will be maintained by this negative feed-back arrangement once the flux-density has been selected.

It has been found that by the use of this negative feed-back circuit the signals are inherently free of distortion. Signal distortion in the past has proved to be difficult to reduce and almost impossible to eliminate. For example, Patent No. 2,176,279, entitled "Method and Apparatus for Magnetically Testing Materials" shows the complicated circuitry that has heretofore been required to compensate for signal distortion. In contra-distinction to this complicated circuitry of the prior art the present circuitry provides a simple method of both eliminating signal distortion and providing a constant flux-density in the material being tested.

The remainder of the circuitry is adapted to modify and control the signals developed in the B and H coils and to convert these signals to a measurement of electrical properties of the strip being tested. The signal from the H coil after passing through the phase inverter 140 is delivered to the voltage divider circuit 146. This circuit is provided in order to use the apparatus with both high permeability strip and low permeability strip. When testing high permeability strip the switch 154 is positioned to connect the phase inverter 140 directly to the integrator 156. When testing low permeability material the switch is placed to connect the phase inverter 140 to the integrator 156 through resistor 148, and the resistor 152 is varied to achieve the exact resistance required to place the signal at the same level for subsequent utilization in the circuit irrespective of its original value. This type of adjustment is well known in the art. From the divider circuit 146 the signal is delivered to the integrator 156 which integrates the dH value signal developed by the H coil and delivers at the output terminal a signal equal to the H value. The signal from the integrator is delivered to the density compensating circuit 158 which is adapted to vary the signal to compensate for the density of the strip being tested. For example, when the switch 166 connects the integrator 156 directly to the amplifier 168 the common density of 7.65 gm./cm.³ is established. When the switch 166 is positioned to connect the integrator 156 to the amplifier 168 through resistor 160 another common density of 7.75 gm./cm.³ is established. For densities between these values the resistor 164 can be varied to select the exact density. From the density compensating circuit 160 the signal is delivered to the current amplifier 168 which amplifies the current and delivers an output signal to the watt-meter 170. The signal delivered to the watt-meter 170 is proportional to the value of H as sensed by the H coil 48 and modified to conform with the permeability and density of the strip being tested.

The signal delivered from the summing amplifier 142 corresponds to the value dB and is fed to operational amplifiers 172 and 174. The operational amplifiers 172 and 174 are adjusted either manually or responsive to thickness gauge and width gauge to vary the signal according to the width and thickness of the strip being tested. The output from the operational amplifier 174 is therefore proportional to the flux-density in the strip since the signal has been varied in proportion to the cross-sectional area of the strip. This signal is delivered to the current amplifier 176 from which it is delivered to the watt-meter 170. This signal corresponds to the value dB and the watt-meter 170 combines this signal with the signal from the current amplifier 168 which corresponds to the value of H and gives a core loss reading directly in watts per pound. Additionally, the signals from the amplifiers 168 and 176 are delivered through the watt-meter 170, ammeters 184 and 186 to ratio meter 182. This ratio meter reads the ratio $B/H$ which is defined as the magnetic permeability of the strip being tested.

The recorder 180 connected to the watt-meter 170 through potentiometer 178 records the value of the core loss as indicated by the watt-meter. The potentiometer preferably is a five-position potentiometer and is used in a well known manner to increase the sensitivity of the recorder. The recorder paper is moved in synchronized timed relationship with the movement of the strip being tested and hence, a permanent record of the core loss is maintained on the recorder 180.

While one embodiment of my invention has been shown and described it will be apparent that other adaptations and modifications may be made without departing from the scope of the following claims.

I claim:

1. Apparatus for determining the magnetic characteristics of strip material comprising, magnetizing means adapted to induce magnetic flux in strip being tested, first inductive means including a measuring coil adapted to produce a signal corresponding to the flux-density induced by the magnetizing means, second inductive means including a sensing coil adapted to produce a signal corresponding to the magnetizing force developed by said magnetizing means, means operably connected to said magnetizing means adapted to energize said magnetizing means to produce a selected flux-density in the strip, means to combine the signals of said coils to produce a modified signal corresponding to the flux-density in said strip, and means to vary the magnetizing force of said magnetizing means inversely proportional to the change in the modified signal whereby the induced flux-density is maintained constant.

2. The combination of claim 1 wherein the last named means includes a summing amplifier having a first input terminal coupled to the measuring coil, a phase inverter having an input terminal coupled to the sensing coil, said phase inverter having its output terminal coupled to a second input terminal of said summing amplifier, the output terminal of said summing amplifier being coupled to the magnetizing means, whereby the output signal from the amplifier is impressed on said magnetizing means to vary the power thereof responsive to the change in flux-density in the strip.

3. Apparatus for determining the magnetic characteristics of strip material comprising, a magnetizing coil adapted to surround the strip being tested and induce flux therein, a measuring coil adapted to measure the change in flux-density induced by the magnetizing coil, a sensing coil adapted to sense the change in magnetizing force developed by said magnetizing coil, power means operably connected to said magnetizing coil adapted to energize said magnetizing coil to produce a selected flux-density in the strip, regulating means adapted to modify the current delivered to said magnetizing coil in proportion to at least one cross-sectional dimension of the strip being tested, a ratio meter operably connected to said measuring coil and said sensing coil adapted to indicate the magnetic permeability of the strip.

4. Apparatus for determining the magnetic characteristics of strip material comprising, magnetizing means adapted to induce magnetic flux in the strip being tested, power means adapted to energize said magnetizing means to produce a flux-density, said power means including a transformer connected to vary the current delivered to the magnetizing means, inductive means adapted to produce a feed-back signal corresponding to the flux-density in the strip, said inductive means including a measuring coil adapted to measure magnetic flux, a sensing coil adapted to measure magnetizing force, and means to combine signals from said coils to produce the feed-back signal, and means adapted to apply said feed-back signal to said transformer to vary the voltage output of said transformer inversely as the feed-back signal varies.

5. Apparatus for determining the magnetic characteristics of strip material comprising, magnetizing means adapted to surround the strip being tested and induce magnetizing flux therein, first inductive means adapted to produce a signal corresponding to the flux-density induced by the magnetizing means, second inductive means adapted to produce a signal corresponding to the magnetizing force developed by said magnetizing means, said first inductive means including a measuring coil positioned and adapted to surround the strip to produce a signal corresponding to the flux-density in the strip and the ambient surroundings of the strip within the coil and said second inductive means including a sensing coil positioned and adapted to produce a signal corresponding to the magnetizing force in the air surrounding the strip within the coil, power means operably connected to said magnetizing means adapted to energize said magnetizing means to produce a selected flux-density in the strip, circuit means adapted to indicate the magnetic condition of the strip from the produced signals, said circuit means including means adapted to combine the signal from the second inductive means with the signal from the measuring coil, first and second variable amplifier means, one of said amplifier means being adapted to modify the combined signal in proportion to the width of the strip and the other in proportion to the thickness of the strip, said combined signal further being used to produce a feed-back signal corresponding to the induced flux-density, said power means including means to utilize said feed-back signal to maintain a constant flux-density in said strip.

6. Apparatus for determining the magnetic characteristics of strip material comprising, magnetizing means adapted to surround the strip being tested and induce magnetizing flux therein, first inductive means adapted to produce a signal corresponding to the flux-density induced by the magnetizing means, second inductive means adapted to produce a signal corresponding to the magnetizing force developed by said magnetizing means, power means operably connected to said magnetizing means adapted to energize said magnetizing means to produce a selected flux-density in the strip, said first inductive means including a measuring coil positioned and adapted to surround said strip to produce a signal corresponding to the flux-density in the strip and the ambient surroundings of the strip within the coil, and said second inductive means including a sensing coil positioned and adapted to produce a signal corresponding to the magnetizing force in the air surrounding the strip within the coil, circuit means adapted to indicate the magnetic condition of the strip from the produced signals said circuit means including means adapted to combine the signal from the second inductive means with the signal from the measuring coil, variable amplifier means adapted to modify the combined signal in proportion to at least one cross-sectional dimension of said strip said combined signal further being used to produce a feed-back signal corresponding to the induced flux-density, said power means including means to utilize said feed-back signal to maintain a constant flux-density in said strip, said second inductive means including said sensing coil and a phase inverter operably connected to said sensing coil adapted to deliver an inverted phase signal from said sensing coil, and said means to combine the signals including a summing amplifier adapted to combine the signal from the measuring coil and the inverted phase signal from the sensing coil to produce said feed-back signal.

References Cited by the Examiner
UNITED STATES PATENTS

| | | | |
|---|---|---|---|
| 1,802,555 | 4/1931 | Hahnemann | 336—20 |
| 1,861,869 | 6/1932 | Long | 336—20 |
| 1,969,536 | 8/1934 | Winnie | 324—34 |
| 2,861,241 | 11/1958 | Leonard | 324—34 |

FOREIGN PATENTS 221,600 10/1957 Australia.

WALTER L. CARLSON, *Primary Examiner.*

F. A. SEEMAR, R. J. CORCORAN, *Assistant Examiners.*